United States Patent [19]

Williams et al.

[11] Patent Number: 4,752,428

[45] Date of Patent: Jun. 21, 1988

[54] INJECTION MOLDING PROCESS WITH REACTIVE GAS TREATMENT

[75] Inventors: Mark A. Williams, Souderton; Bernard D. Bauman, Coopersburg; David R. Ruprecht, Laurys Station; Paul D. Marsh, New Tripoli, all of Pa.

[73] Assignee: Air Products and Chemicals, Inc., Allentown, Pa.

[21] Appl. No.: 7,690

[22] Filed: Jan. 28, 1987

[51] Int. Cl.⁴ .................... B29C 33/10; B29C 45/17
[52] U.S. Cl. .................... 264/83; 264/328.12
[58] Field of Search .............. 264/83, 328.1, 328.12; 425/546

[56] References Cited

U.S. PATENT DOCUMENTS

| | | | |
|---|---|---|---|
| 2,811,468 | 10/1957 | Joftre | 117/95 |
| 3,255,099 | 6/1966 | Wolinski | 204/169 |
| 3,555,620 | 10/1967 | Bucy | 425/546 |
| 3,862,284 | 1/1975 | Dixon et al. | 264/83 |
| 3,988,491 | 10/1976 | Dixon et al. | 428/288 |
| 4,009,304 | 2/1977 | Dixon et al. | 427/322 |
| 4,020,223 | 4/1977 | Dixon et al. | 264/83 |
| 4,412,804 | 11/1983 | Huther | 425/546 |
| 4,435,453 | 3/1984 | Vieth et al. | 264/50 |
| 4,548,867 | 10/1985 | Veno et al. | 264/83 |
| 4,550,043 | 10/1985 | Beck | 428/36 |

FOREIGN PATENT DOCUMENTS

| | | | |
|---|---|---|---|
| 4720251 | 9/1972 | Japan | 264/83 |
| 6019519 | 1/1985 | Japan | 264/328.1 |
| 61152421 | 7/1986 | Japan | 546/ |
| 1169394 | 11/1969 | United Kingdom | 264/328.1 |

*Primary Examiner*—Jan H. Silbaugh
*Assistant Examiner*—Neil Michael McCarthy
*Attorney, Agent, or Firm*—Mark L. Rodgers; William F. Marsh; James C. Simmons

[57] ABSTRACT

The present invention is a process for making shaped articles by injecting a thermoplastic or thermoset polymer into a mold cavity in which is maintained at atmosphere containing between 0.1 mole % and 50 mole % $F_2$ and at least 20 ppm $O_2$ while said polymer is being injected into the mold. The process results in shaped articles having altered physical and chemical characteristics. A weld line formed where two interfaces of the polymer are joined in the mold cavity serves as a clean break point when pressure is applied to an article formed by the process. The atmosphere in the mold cavity may contain $SO_3$.

17 Claims, No Drawings

INJECTION MOLDING PROCESS WITH REACTIVE GAS TREATMENT

TECHNICAL FIELD OF THE INVENTION

The present invention relates to injection molding processes for making shaped articles having improved physical and chemical properties.

BACKGROUND OF THE INVENTION

Injection molding has become a major method for producing articles from a wide variety of thermoplastic polymers. Typical injection molding processes involve several basic steps. The first step is to plasticize the thermoplastic polymer to a point where it will flow under pressure. This is usually done by masticating with a reciprocating screw while simultaneously heating until it forms a melt at elevated and uniform temperature and uniform viscosity. The liquid is then injected into the mold where it is shaped into the desired object by the confines of the mold cavity. The liquid is allowed to solidify under pressure within the mold after which the mold is opened and the article is recovered.

U.S. Pat. No. 4,435,453 discloses a method of increasing the barrier properties of containers manufactured by conventional injection molding techniques. A controlled amount of saturated gas is added under pressure into a molten polymer stream residing in the screw channels of a screw type plasticizer employed in a preform injection molding machine. The gas is added in an amount to saturate the plastic walls of the container so that when a beverage containing that gas is sealed in the container, gas from the beverage will not be absorbed into the container walls.

U.S. Pat. No. 4,550,043 discloses preforms formed by injection molding thermoplastic materials within the preform comprises inner and outer first layers of a thermoplastic resin, inner and outer second layers of a barrier material and a second layer of thermoplastic material between the barrier layers. The preform is subsequently used to form articles in blow molding operations.

Most other attempts at altering the physical and/or chemical properties of thermoplastic polymeric articles have been directed toward blow-molding operations or involved post-treatment techniques.

U.S. Pat. No. 3,862,284 discloses a process whereby the barrier properties of blow molded thermoplastic articles are improved by employing a blowing gas containing about 0.1 to about 20% by volume fluorine during the expansion stage of the blow-molding operation.

Joffe, U.S. Pat. No. 2,811,468 teaches improving the barrier properties of polyethylene film toward atmospheric gases by fluorinating at least one surface of the film to contain not more than about 3.5% by weight fluorine.

U.S. Pat. No. 3,255,099 discloses a process for modifying and improving the surface characteristics of polymeric shaped structures by subjecting the surface of the structure to the action of an electrical discharge between positive and negative electrodes in a gaseous atmosphere consisting essentially of the vapor of an inorganic agent having an affinity for electrons.

U.S. Pat. No. 3,988,491 discloses a process for improving dye receptivity and soil and stain release properties of fiber form materials such as polyesters and polyamides. The improved properties are achieved by subjecting the fibers to fluorine treatment in the presence of little or no oxygen for brief periods of time.

U.S. Pat. No. 4,009,304 teaches a process for improving adhesion of polyester yarn, tire cord or fabric in polyester reinforced rubber goods, such as tires. Improved adhesion is achieved by fluorinating the polyester yarn, tire cord or fabric prior to incorporation into the tire or rubber goods.

BRIEF SUMMARY OF THE INVENTION

The present invention is an injection molding process for making thermoplastic polymeric shaped articles having improved physical and chemical properties. The process comprises injecting the thermoplastic polymer, in a plasticized state, into a mold cavity in which is maintained an atmosphere containing between 0.1 mole % and 50 mole % $F_2$ and at least 20 ppm and preferably at least 100 ppm $O_2$. Provisions are made to allow the gas to exhaust from the mold cavity as the plasticized polymer is being injected into the cavity.

The thermoplastic polymer is allowed to cool and harden before being recovered from the mold. The resulting thermoplastic shaped articles exhibit improved properties such as improved coating adhesion (e.g. paints, inks, etc.), improved substrate bonding and the ability to form a clean break at weld lines formed at points where two interfaces of the plasticized polymer join in the mold.

In addition to exhibiting altered physical and chemical properties, the polymeric shaped articles are treated in-situ while they are being molded which allows for an efficient, continuous on-line process.

DETAILED DESCRIPTION OF THE INVENTION

The present invention is an improvement in conventional injection molding processes to produce thermoplastic polymeric shaped articles having improved physical and chemical properties.

Conventional injection molding processes comprise injecting a plasticized thermoplastic or thermoset polymer material into a mold cavity contoured in accordance with the desired shape of the article to be formed. The polymeric material is confined under pressure in the mold while heat is removed to solidify the plastic and freeze it permanently into the desired shape, after which it is ejected from the mold.

It has now been found that improvements in the physical and/or chemical characteristics of injection molded thermoplastic articles can be attained by maintaining in the mold cavity a reactive atmosphere containing between 0.1 mole % and 50 mole % $F_2$ and at least 20 ppm and preferably at least 100 ppm $O_2$ while the polymeric material is being injected into the mold. The reactive atmosphere may be introduced and maintained in the mold cavity in any suitable fashion, such as by pulling a vacuum to evacuate the mold cavity and subsequently adding the reactive gas, or alternatively by a one-step flush process whereby the gas is introduced through one set of vents displacing the gas in the mold which is discharged through another set of vents. As with conventional injection molding processes using air filled mold cavities, a means must be provided for exhausting the reactive gas from the mold cavity while the polymeric material is being injected into said cavity.

While a fluorine concentration of between 0.1 mole % and 50 mole % can be employed, it is preferred that the concentration be maintained between 2 mole % and 10 mole %. In addition to the fluorine and at least 20 ppm $O_2$, the balance of the reactive atmosphere can comprise any components which do not adversely interfere with the interaction between the polymeric material and the $O_2/F_2$ atmosphere; with typical examples being nitrogen or air. Other examples of suitable gaseous atmospheres include: $F_2/Cl_2$, $F_2/Cl_2/N_2$, $F_2/SO_2/N_2$, $F_2/SO_3/N_2$, $F_2/SO_3/N_2$, $F_2/SO_2Cl_2/N_2$, $F_2/SO_2Cl/N_2$ and similar gaseous mixtures all containing at least 20 ppm of oxygen. The source of oxygen may be as a separate entity added to the gas mixture, as part of one of the components of the gas mixture (e.g. $SO_2$), as an impurity in the fluorine source, or even as residual gas present in the mold. While the source of fluorine is typically gaseous $F_2$, other examples of fluorine sources include $PF_5$, $CF_4$, $NF_3$, $CH_3COF$ and the like.

It is also believed that, in at least some instances, $SO_3$ may be substituted for the fluorine in the mold atmosphere without adversely effecting the desired results. In such instances the $SO_3$ may be used in combination with a fluorine source, or may be used alone or with other gaseous components. If the $SO_3$ is used without fluorine, the $SO_3$ concentrating preferably should be at least 0.1 mole %.

The present process has been found to be capable of improving various chemical and/or physical characteristics of a wide range of thermoplastic polymeric substrates. For example, injection molded articles produced in accordance with this invention exhibit increased surface bond strength with the same or other polymer materials, increased coating adhesion, increased surface energy and the ability to form a clean break at weld lines formed at points where two interfaces of the plasticized polymer join in the mold.

The present process can be operated as a continuous on-line process, with the contact time between the polymeric material and the reactive atmosphere being relatively short; i.e. in some instances as little as one second or less. The injection molding technique is such that, when the plasticized material flows into the mold, a front of molten material is set up such that a layer forms against the side of the mold and a new material continues to fill the cavity by flowing through the center of the part; i.e., parabolic flow. This type of flow results in fresh material continuously coming into contact with the remaining gas in the cavity and then forming the surface of the article, thereby insuring nearly uniform treatment across the entire surface of the article.

Any polymeric thermoplastic or thermoset material which is capable of being plasticized and injected into a mold can be used in this invention. Specific examples of materials well suited for this process include polyolefins such as low-density polyethylene, high-density polyethylene, and polypropylene; polyesters; polyamides; polyimides; polycarbonates; sulfones; and the like. The temperature of the process will vary depending upon the polymeric material used, with the initial temperature being sufficient to plasticize the polymer and allow it to flow into the mold cavity. The mold pressure can be maintained at atmospheric, although it has been found, at least in some instances, that higher pressures, such as 25 psig and above, can result in further improvements in the surface characteristics of the formed articles, and also may result in greater changes in the surface chemistry.

The changes in the physical and/or chemical characteristics of the injection molded parts which result from this process are believed to be the result of alterations in the chemical make-up of the surface of the parts. Several polypropylene (pp) plaques were injection molded using various reactive atmospheres within the mold cavity at atmospheric pressure (in-situ). Several plaques were also molded using air in the mold cavity and a number of these plaques were post treated with a fluorine containing gas while an untreated plaque was used as a control. The results from photoelectron spectroscopy (ESCA) for the control and treated plaques are reported in Table 1 below.

TABLE 1

| Material | Treatment Method | Treatment Gas Composition | Mold Pressure (PSIG) | Elemental Surface Composition % | | |
|---|---|---|---|---|---|---|
| | | | | C | F | O |
| PP | CONTROL | AIR | 0 | 95.4 | 0.0 | 3.1 |
| PP | IN-SITU | 1% $F_2$/AIR* | 0 | 78.2 | 2.0 | 12.6 |
| PP | IN-SITU | 4% $F_2$/AIR** | 0 | 88.3 | 3.6 | 6.9 |
| PP | IN-SITU | 10% $F_2/N_2$ | 0 | 55.8 | 39.0 | 5.0 |
| PP | IN-SITU | 10% $F_2/N_2$ | 54 | 43.5 | 53.4 | 2.9 |
| PP | POST-TREAT | 1% $F_2$/AIR | 0 | 69.2 | 16.0 | 14.8 |
| PP | POST-TREAT | 2% $F_2$/AIR | 0 | 69.4 | 16.6 | 14.0 |
| PP | POST-TREAT | 4% $F_2$/AIR | 0 | 65.0 | 19.4 | 15.5 |
| HDPE | CONTROL | AIR | 0 | 100.0 | 0.0 | 0.0 |
| HDPE | IN-SITU | 1% $F_2$/AIR | 50 | 69.7 | 16.0 | 14.2 |
| HDPE | IN-SITU | 8% $F_2$/AIR | 0 | 67.0 | 17.0 | 15.6 |
| HDPE | IN-SITU | 8% $F_2$/AIR | 52 | 65.5 | 19.0 | 15.6 |
| HDPE | IN-SITU | 10% $F_2/N_2$ | 0 | 65.4 | 31.8 | 2.8 |
| HDPE | IN-SITU | 10% $F_2/N_2$ | 50 | 50.0 | 46.5 | 3.5 |
| HDPE | POST-TREAT | 10% $F_2/N_2$ | 0 | 58.2 | 33.6 | 8.0 |

*Blending 1 part (10% $F_2/N_2$) with 9 parts air.
**Blending 2 parts (10% $F_2/N_2$) with 3 parts air.

As can be seen from the ESCA results reported above, the injection molding process of the present invention results in alteration of the surface composition of the injection molded part. Surface alteration is observed for parts molded at 0 psig as well as for parts molded at increased pressures. Additionally, the concentration of oxygen on the surface indicates the presence of oxygen in the mold cavity even for runs using only an $F_2/N_2$ treatment gas.

The following examples are meant to illustrate the present invention and are not meant to be limiting.

EXAMPLE 1

A high density polyethylene (HDPE) plaque was formed by injection molding plasticized HDPE into a mold cavity containing a reactive gas mixture containing about 4% by volume $F_2$ and at least 20 ppm $O_2$ at atmospheric mold pressure. The mold cavity was designed such that the flowing HDPE formed a weld line in the center of the plaque. Two other HDPE plaques were injection molded using the same mold and same resin, but with the cavity filled with air. One of these plaques was subsequently post treated with a gas stream containing 4% by volume $F_2$. The injection rate in all instances was about 18 cm$^3$/sec and the HDPE used had a Melt Index of 30.

The plaques were tested for weld line strength and failure mode using Instron tenile test equipment, and the results are reported in Table 2 below.

TABLE 2

| Material | Treatment Method | Reactive Gas Concentration | Failure Mode | Average Failure Stress | Standard Deviation |
|---|---|---|---|---|---|
| HDPE | None | 0% | Yield | 4825 psi | 50 psi |
| HDPE | in-situ | 4% | Break | 3875 psi | 175 psi |
| HDPE | Post-treatment | 4% | Yield | 4875 psi | 25 psi |

The results reported above indicate that the part which was injection molded in accordance with the present invention exhibited a clean, smooth break at the weld line interface, whereas both the untreated and post treated parts initially yielded at the weld line and exhibited a rough and irregular surface when they broke.

EXAMPLE 2

A second test was carried out to determine the failure mode and average failure stress of weld lines present in injected molded HDPE and also PP parts. The parts were injection molded into mold cavities having various reactive atmospheres as set out below. Additionally, a HDPE and a PP part were both injection molded using an air filled mold as controls. The HDPE had a melt index of 0.5 and the PP had a melt index of 12. The injection rate in all cases was about 18 cm$^3$/sec. The results are reported in Table 3 below.

TABLE 3

| Material | Mold Gas | Failure Mode | Average Failure Stress | Standard Deviation Failure Stress |
|---|---|---|---|---|
| HDPE | Control (Air) | Yield | 3582 psi | 75 psi |
| HDPE | 4% $F_2$/Air | Break | 3006 | 95 |
| PP | Control (Air) | Yield | 5104 | 46 |
| PP | 1% $F_2$/Air | Break | 3281 | 627 |
| PP | 2% $F_2$/Air | Break | 3047 | 644 |
| PP | 4% $F_2$/Air | Break | Broke in Mold | |

The results reported above are consistent with the results of Example 1 and indicate that the parts which were injection molded in accordance with the present invention showed a clean smooth break at the weld line, and did not exhibit yielding and stretching of the part close to the weld line as was observed with the controls.

EXAMPLE 3

Tests were carried out to compare the Lap Shear strength of bonded polypropylene plaques made in accordance with the present invention versus post-treated parts and a control part. Identically treated plaques were bonded together over one square inch of surface using a polyurethane adhesive and the force needed to separate the parts was measured. The results of this test, along with the specific treatment conditions employed are reported in Table 4 below.

TABLE 4

| Substrate Material | Plaque Dimensions | Treatment Method | Gas Composition | Gas Pressure | Adhesive Type | Sample 1 Shear[1] Strength | Sample 1 Failure[2] Mode | Sample 2 Shear[1] Strength | Sample 2 Failure[2] Mode |
|---|---|---|---|---|---|---|---|---|---|
| PP[4] | 1" × 2" × ¼" | IN-SITU | AIR | 0 PSIG | PU[3] | 0 | A | 12 | A |
| PP | 1" × 2" × ¼" | IN-SITU | 1% $F_2$/AIR | 0 PSIG | PU | 309 | A | 360 | A |
| PP | 1" × 2" × ¼" | IN-SITU | 1% $F_2$/AIR | 54 PSIG | PU | 679 | S | 568 | S |
| PP | 1" × 2" × ¼" | IN-SITU | 2% $F_2$/AIR | 0 PSIG | PU | 310 | A | 390 | A |
| PP | 1" × 2" × ¼" | IN-SITU | 4% $F_2$/AIR | 0 PSIG | PU | 369 | A | 315 | A |
| PP | 1" × 2" × ¼" | IN-SITU | 1% $F_2$/$N_2$ | 0 PSIG | PU | 260 | A | 288 | A |
| PP | 1" × 2" × ¼" | IN-SITU | 1% $F_2$/$N_2$ | 54 PSIG | PU | 842 | S | 468 | A |
| PP | 1" × 2" × ¼" | POST TREAT | 1% $F_2$/AIR | 0 PSIG | PU | 702 | S | 698 | S |
| PP | 1" × 2" × ¼" | POST TREAT | 2% $F_2$/AIR | 0 PSIG | PU | 890 | S | 825 | S |
| PP | 1" × 2" × ¼" | POST TREAT | 4% $F_2$/AIR | 0 PSIG | PU | 870 | C | 940 | S |
| PE[5] | 1" × 2" × ¼" | IN-SITU | AIR | 0 PSIG | PU | 88 | A | 55 | A |
| PE | 1" × 2" × ¼" | IN-SITU | 8% $F_2$/AIR | 0 PSIG | PU | 359 | S | Unavailable | |
| PE | 1" × 2" × ¼" | IN-SITU | 8% $F_2$/AIR | 52 PSIG | PU | 428 | S | 446 | S |
| PE | 1" × 2" × ¼" | IN-SITU | 10% $F_2$/$N_2$ | 0 PSIG | PU | 474 | S | Unavailable | |
| PE | 1" × 2" × ¼" | IN-SITU | 10% $F_2$/$N_2$ | 54 PSIG | PU | 450 | S | 443 | S |
| PE | 1" × 2" × ¼" | IN-SITU | AIR | 0 PSIG | EPOXY | 85 | A | Unavailable | |
| PE | 1" × 2" × ¼" | IN-SITU | 8% $F_2$/AIR | 52 PSIG | EPOXY | 132 | S | 148 | S |
| PE | 1" × 2" × ¼" | IN-SITU | 10% $F_2$/$N_2$ | 0 PSIG | EPOXY | 117 | S | Unavailable | |
| PE | 1" × 2" × ¼" | IN-SITU | 10% $F_2$/$N_2$ | 54 PSIG | EPOXY | 167 | S | 127 | S |
| PE | 1" × 2" × ¼" | POST TREAT | 8% $F_2$/AIR | 0 PSIG | EPOXY | 115 | S | Unavailable | |
| PE | 1" × 2" × ¼" | POST TREAT | 10% $F_2$/$N_2$ | 0 PSIG | EPOXY | 129 | S | Unavailable | |

[1]Shear strength reported as pounds per linear inch.
[2]Failure Type A = Adhesive; C = Cohesive; S = Substrate
[3]PU = Polyurethane
[4]PP = Polypropylene
[5]PE = Polyethylene The results reported above indicate that in-situ treated polypropylene plaques bonded together with polyurethane exhibit improved shear strength over conventional injection molded parts. The in-situ treated polyethylene plaques bondedd with either polyurethane or epoxy, exhibited a significant increase in shear strength to the extent that the failure mode exhibited was substrate failure rather than adhesive failure which was exhibited by conventional (untreated) injection molded parts. In some instances, such as polypropylene bonded with polyurethane, bonding strength improved significantly with increased mold pressure, even to the extent of improving the failure mode from adhesive failure to substrate failure.

In summary, the results of the above Examples clearly show the unique and advantageous properties exhibited by injection molded thermoplastic parts made in accordance with the present invention. The parts exhibit smooth clean breaking at weld lines which is a useful property for ampules containing medicines, bottles with break-away caps, and for model parts connected to a common runner which must be separated from the runner when used. Additionally, the present process imparts improved bonding strength to the parts for substrate and coating adhesion.

Having thus described the present invention, what is now deemed appropriate for Letters Patent is set out in the following appended claims.

What is claimed is:

1. In a process for making shaped articles by injecting a plasticized thermoplastic or thermoset polymer into a mold cavity, the improvement for altering the physical and chemical characteristics of the resulting article which comprises:

maintaining in said mold cavity an atmosphere containing between 0.1 mole % and 50 mole % $F_2$ and at least 20 ppm $O_2$ while said polymer is being injected into the mold cavity, and forming a weld line where two interfaces of the plasticized polymer are joined in the mold cavity; the physical and chemical characteristics of the resulting article being altered such that said weld line is capable of forming a clean break point when pressure is applied to the article.

2. A process in accordance with claim 1 wherein said atmosphere in the mold cavity contains between 2 mole % and 10 mole % $F_2$.

3. A process in accordance with claim 1 wherein the balance of the atmosphere in the mold cavity is inert gaseous components.

4. A process in accordance with claim 1 wherein the balance of the atmosphere in the mold cavity is air.

5. A process in accordance with claim 1 wherein the thermoplastic or thermoset polymer is a polyolefin.

6. A process in accordance with claim 1 wherein the pressure within the mold cavity is maintained between 20 and 60 psig.

7. A process in accordance with claim 1 wherein said atmosphere in the mold cavity contains at least 100 ppm $O_2$.

8. A process for injection molding an article from a plasticized thermoplastic or thermoset polymer such that the resulting article has altered physical and chemical properties, said process comprising:

(a) evacuating or displacing air or other gas from the cavity of a mold;
(b) introducing a reactive gas containing between 0.1 mole % and 50 mole % $F_2$ into the mold cavity;
(c) plasticizing the thermoplastic polymer or blending the thermoset polymer; and
(d) injecting the resultant polymer into the mold cavity containing the reactive gas, and forming a weld line where two interfaces of the plasticized polymer are joined in the mold cavity; the physical and chemical characteristics of the resulting article being altered such that said weld line is capable of forming a clean break point when pressure is applied to the article.

9. A process in accordance with claim 8 wherein said reactive gas contains between 2 mole % and 10 mole % $F_2$ in air.

10. A process in accordance with claim 8 wherein said polymer is a polyolefin.

11. A process in accordance with claim 8 wherein said mold cavity is pressurized to between 20 psig and 60 psig.

12. A process in accordance with claim 8 wherein the surface of said article has increased surface energy relative to an untreated article.

13. A process in accordance with claim 1 wherein the surface of said article has improved bonding and adhesion characteristics relative to an untreated article.

14. A process in accordance with claim 8 wherein said reactive gas also contains at least 20 ppm of $O_2$.

15. In a process for making shaped articles by injecting a plasticized thermoplastic or thermoset polymer into a mold cavity, the improvement for altering the physical and chemical characteristics of the resulting article which comprises:

maintaining in said mold cavity an atmosphere containing at least 0.1 mole % $SO_3$ while said polymer is being injected into the mold, and forming a weld line where two interfaces of the plasticized polymer are joined in the mold cavity; the physical and chemical characteristics of the resulting article being altered such that said weld line is capable of forming a clean break point when pressure is applied to the article.

16. A process in accordance with claim 15 wherein the atmosphere in the mold cavity contains between 0.1 mole %–50 mole % $SO_3$ and the balance being inert gaseous components.

17. A process in accordance with claim 15 wherein the pressure within the mold cavity is maintained between 20 and 60 psig.

* * * * *